(12) United States Patent  
Miga

(10) Patent No.: US 6,663,170 B1  
(45) Date of Patent: Dec. 16, 2003

(54) TWO PIECE ENGINE ACCESS COVER ASSEMBLY

(75) Inventor: Michael A. Miga, Summerfield, NC (US)

(73) Assignee: Volvo Trucks North America, Greensboro, NC (US)

( * ) Notice: Subject to any disclaimer, the term of this patent is extended or adjusted under 35 U.S.C. 154(b) by 0 days.

(21) Appl. No.: 10/198,595

(22) Filed: Jul. 18, 2002

(51) Int. Cl.[7] .............................................. B62D 25/24
(52) U.S. Cl. ................... 296/190.08; 180/69.2; 180/69.24; 180/89.18
(58) Field of Search ................... 296/190.08; 180/69.2, 180/89.12, 89.17, 89.18, 89.19, 69.24; 277/628, 630, 640

(56) References Cited

U.S. PATENT DOCUMENTS

| 4,082,343 A | * | 4/1978 | Hurt, II et al. ......... 296/190.03 |
| 4,099,590 A | | 7/1978 | Martin, Sr. ............... 180/69 C |
| 4,222,451 A | | 9/1980 | Lamb ..................... 180/89.18 |
| 4,623,186 A | | 11/1986 | Chavarria et al. .......... 296/1 R |
| 4,770,263 A | | 9/1988 | Yoshioka ................. 180/89.17 |
| 4,953,771 A | | 9/1990 | Fischer et al. .............. 224/273 |
| 4,991,457 A | * | 2/1991 | Chen ....................... 74/473.36 |
| 5,267,739 A | * | 12/1993 | Vaughan ..................... 277/642 |
| 5,289,962 A | | 3/1994 | Tull et al. .................... 224/273 |
| 5,327,988 A | | 7/1994 | Lenz et al. ............... 180/89.18 |
| 5,372,399 A | * | 12/1994 | Ito et al. .................. 296/65.05 |
| 5,524,958 A | | 6/1996 | Wieczorek et al. ..... 297/188.17 |
| 5,527,008 A | | 6/1996 | Schutter et al. .......... 248/311.2 |
| 5,803,421 A | | 9/1998 | Kerner et al. ............. 248/311.2 |
| 5,860,630 A | | 1/1999 | Wildey et al. ............ 248/311.2 |
| 5,863,093 A | * | 1/1999 | Novoa et al. ........... 296/190.01 |
| 5,897,089 A | | 4/1999 | Lancaster et al. ........ 248/311.2 |
| 5,921,519 A | | 7/1999 | Dexter et al. ............. 248/311.2 |
| 5,944,240 A | | 8/1999 | Honma ........................ 224/281 |
| 6,076,793 A | | 6/2000 | Yamamoto ................ 248/311.2 |
| 6,092,775 A | | 7/2000 | Gallant ..................... 248/311.2 |
| 6,095,471 A | | 8/2000 | Huang ...................... 248/311.2 |
| 6,230,948 B1 | | 5/2001 | Steiger et al. ............... 224/539 |
| 6,244,369 B1 | | 6/2001 | Yunoue et al. ........... 180/89.12 |
| 6,253,975 B1 | | 7/2001 | Ichioka et al. .............. 224/281 |
| 6,260,912 B1 | | 7/2001 | Mondragon Sarmiento et al. ..... 296/190.08 |
| 6,361,008 B1 | | 3/2002 | Gravenstreter ........... 248/311.2 |

FOREIGN PATENT DOCUMENTS

| JP | 6092171 | * | 5/1985 | .............. 180/89.18 |
| JP | 2000-255458 | | 9/2000 | |
| JP | 2001-233101 | | 8/2001 | |

* cited by examiner

Primary Examiner—Stephen T. Gordon  
Assistant Examiner—Paul Chenevert  
(74) Attorney, Agent, or Firm—Watts Hoffmann, Co. L.P.A.

(57) ABSTRACT

An engine access cover assembly in a cab of an over the highway truck or tractor. The assembly includes a mounting bezel and an engine cover. The mounting bezel is fastened to a perimeter of an engine access opening. The mounting bezel defines a cover mounting surface that extends past an obstruction, such as a fixed floor mat in the cab. The engine cover has a mating surface that coacts with the mounting surface. A plurality of fastening members, such as screws or latches, secure the bezel and cover together.

13 Claims, 3 Drawing Sheets

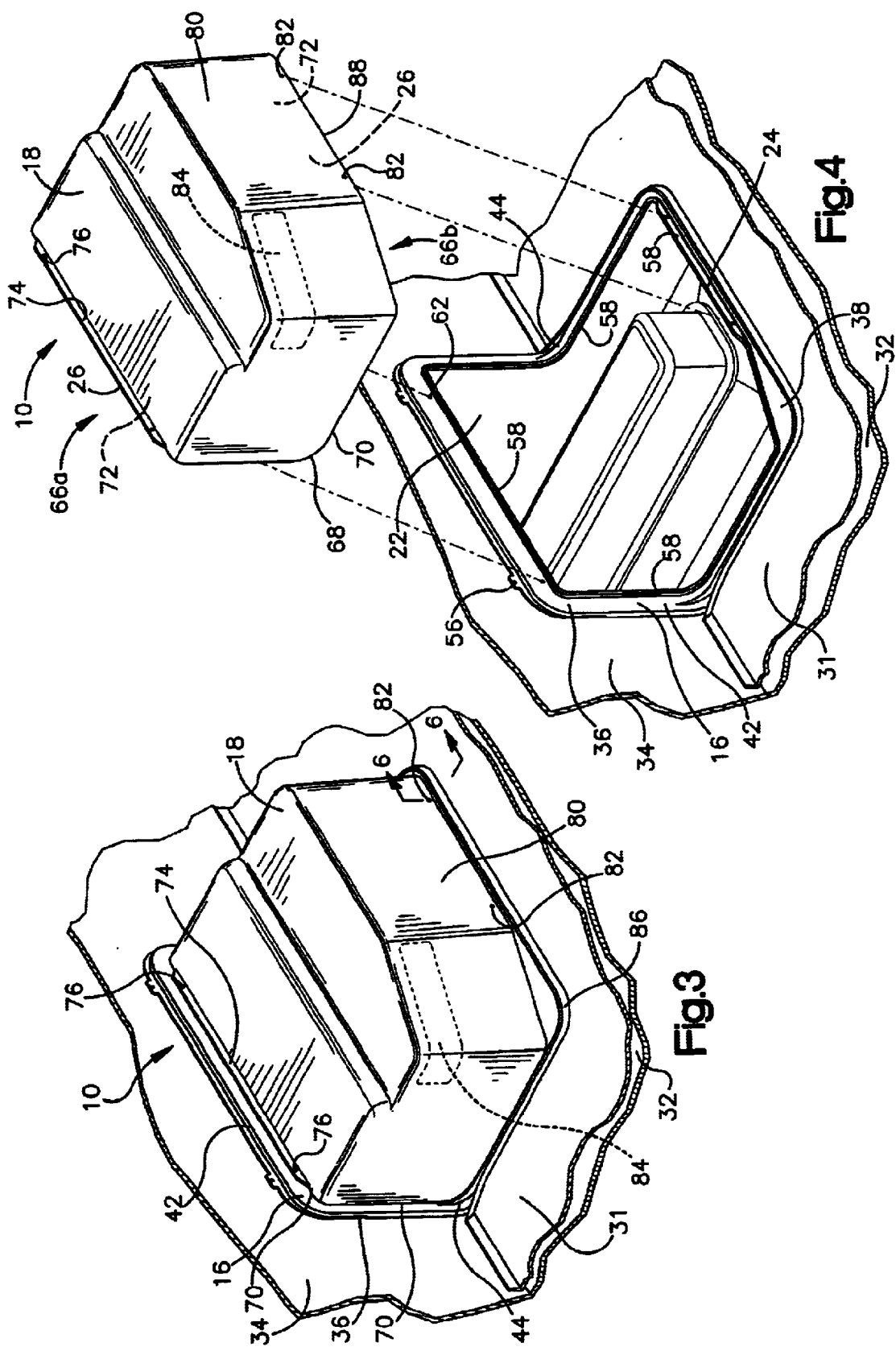

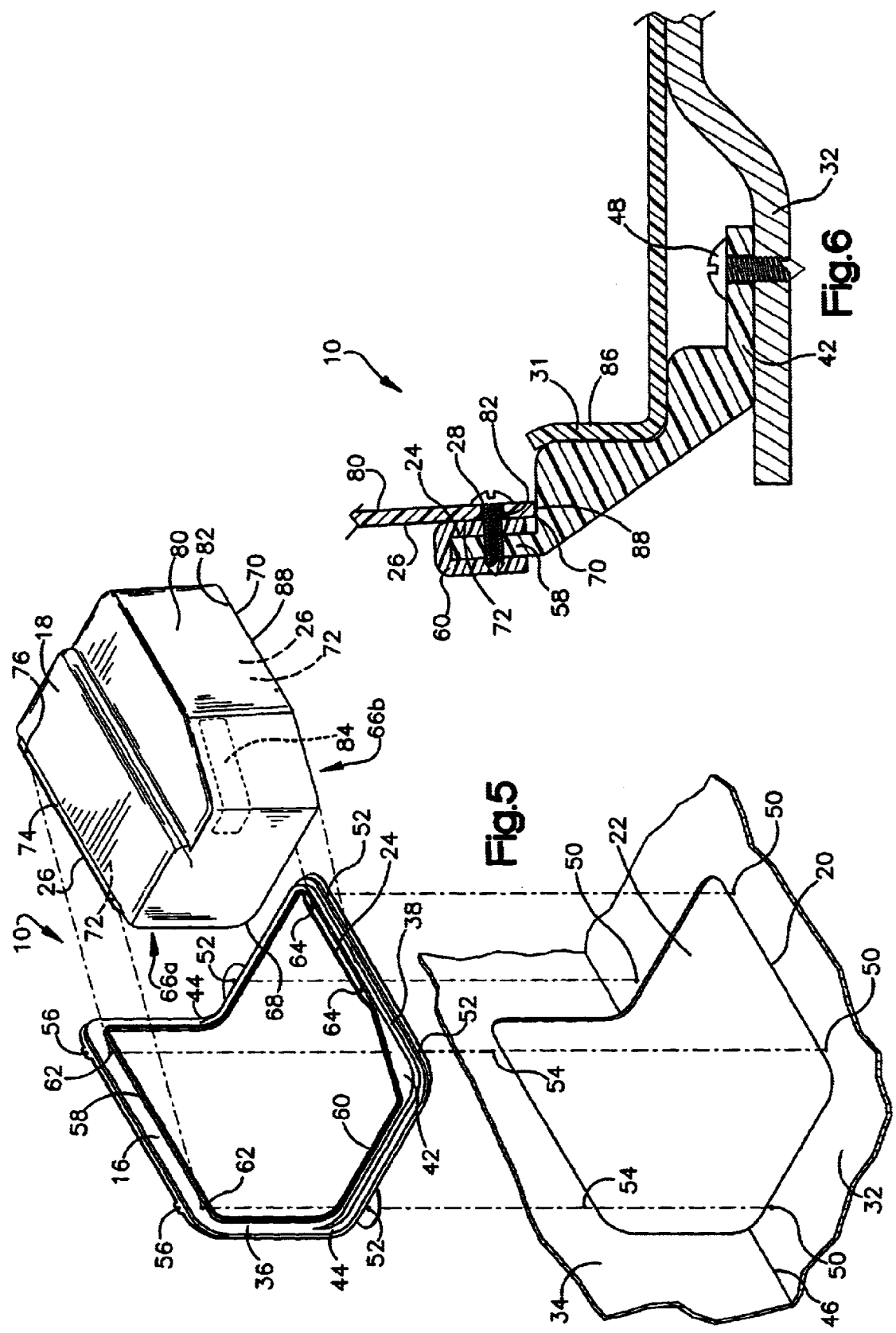

TWO PIECE ENGINE ACCESS COVER ASSEMBLY

FIELD OF THE INVENTION

The present invention relates generally to a cab compartment engine access cover for an over-the-highway truck or tractor vehicle. In particular, the present invention relates to a two piece cab compartment engine access cover.

BACKGROUND OF THE INVENTION

Over-the-highway truck or tractor vehicles, such as class 8 trucks, include engine access covers for accessing the rear of the engine via the cab compartment to service the engine. The engine access covers are tightly sealed and provide a sound barrier.

Typically, an existing engine access cover sits deep in the cab and a fixed floor mat overlaps a lower edge of the engine access cover. The floor mat overlaps a lower edge of the engine access cover, covering fasteners that secure the engine access cover. A number of parts in the cab that surround the engine access cover need to be removed in order to relieve the overlapping edge of the floor mat to access the mounting fasteners of the engine access cover. The parts that may need to be removed include a scuff plate, a grab handle, a cold draft panel, an HVAC duct, and sometimes the passenger seat. As a result, the time required to remove the in cab engine access cover accounts for a considerable portion of the overall repair time.

There is a need for a two piece engine access cover assembly that includes a cover that can be removed without removing additional parts in the cab. The two piece engine access cover allows engine access from inside a truck or tractor cab without removing additional parts.

SUMMARY OF THE INVENTION

The present invention concerns an engine access cover assembly in a cab of an over the highway truck or tractor. The assembly includes a mounting bezel and an engine cover. The mounting bezel is fastened to a perimeter of an engine access opening. The mounting bezel defines a cover mounting surface that extends past an obstruction, such as a fixed floor mat in the cab. The engine cover has a mating surface that coacts with the mounting surface. A plurality of fastening members, such as screws or latches, secure the bezel and cover together.

When the obstruction is a fixed floor mat in the cab, the bezel mounting surface is above a floor mat lip. Positioning the bezel mounting surface above the floor mat lip eliminates the need to remove the floor mat to remove the engine access cover.

In one embodiment, the access cover mating surface is sealed to the bezel mounting surface. A gasket between the mounting surface of the bezel and the mating surface of the cover may be used to seal the interface between the cover and the bezel. The gasket may be formed from a closed cell foam.

The bezel and cover may each be formed from mineral filled thermoset polyurethane. In one embodiment, the engine access cover includes a flush mount fold out cup holder.

In use, the mounting bezel is fastened to a perimeter of the engine access opening. A floor mat is then secured to the floor such that the cover mounting surface of the mounting bezel extends past a lip of the floor mat. The gasket is placed on the cover mounting surface of the bezel. The mating surface of the engine cover is brought into contact with the gasket and is connected to the mounting surface.

Additional features of the invention will become apparent and a fuller understanding will be obtained by reading the following detailed description in connection with the accompanying drawings.

BRIEF DESCRIPTION OF THE DRAWINGS

FIG. 3 is a perspective view of an engine access cover assembly embodying the present invention;

FIG. 4 is a perspective view of an engine access cover assembly that includes a bezel and an engine access cover with a mat covering a flange of the bezel;

FIG. 5 is an exploded perspective view of an engine access cover assembly embodying the present invention; and, FIG. 6 is a sectional view taken along lines 6—6 of FIG. 3.

DETAILED DESCRIPTION OF THE INVENTION

Figure 1:
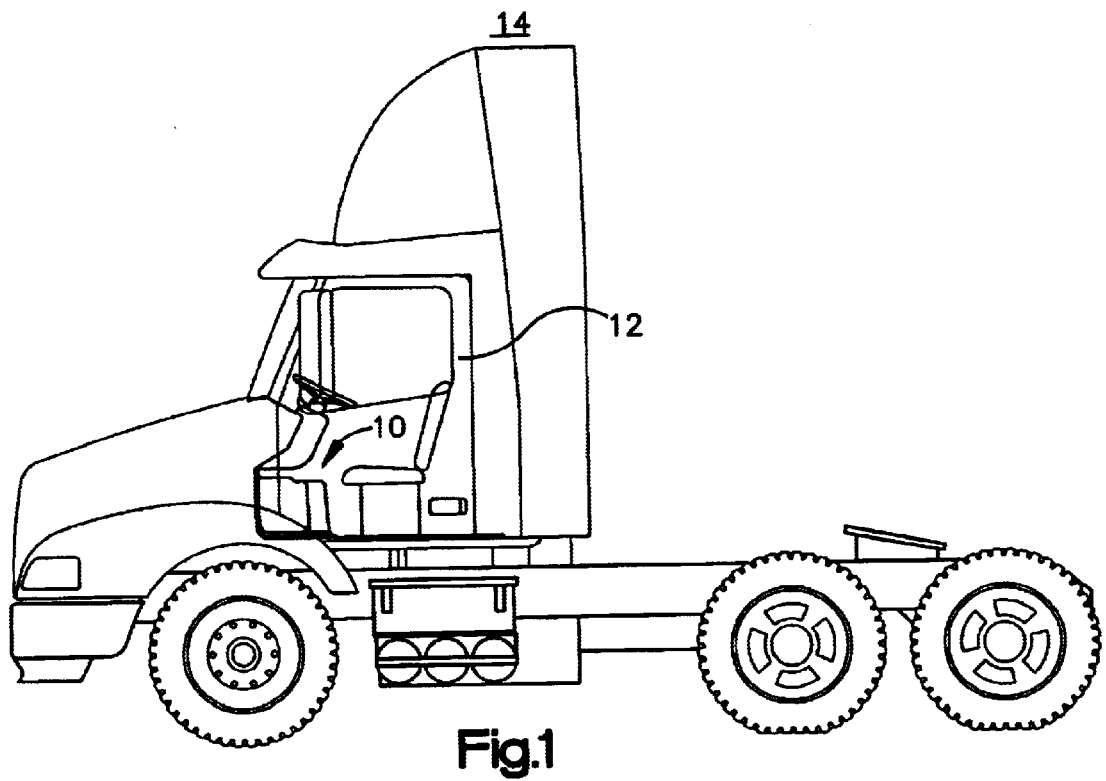
FIG. 1 is a side elevational illustration of an over the highway tractor having an engine access cover assembly embodying the present invention.
Figure 2:
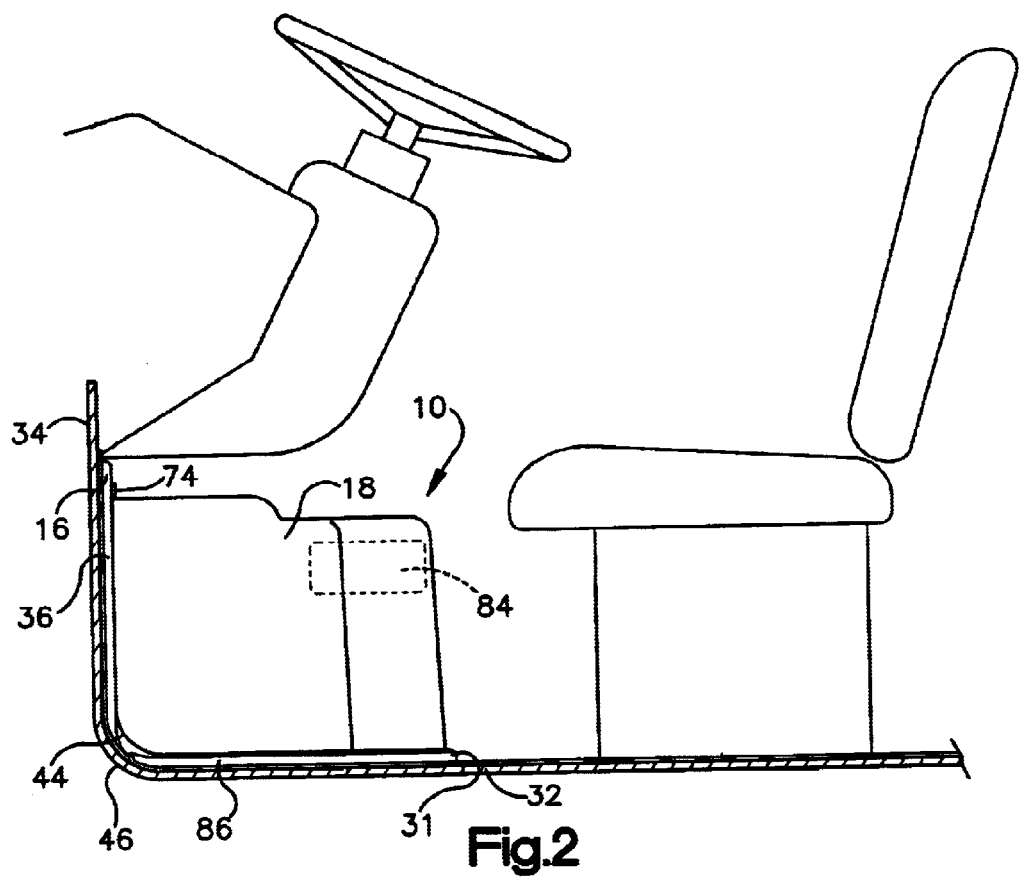
FIG. 2 is a side elevational view of a cab interior that includes an engine access cover assembly embodying the present invention.

The present disclosure concerns an engine access cover assembly 10 for use in a cab 12 of an over the highway truck or tractor 14. The engine access cover includes a mounting bezel 16 and an engine cover 18. The mounting bezel 16 is fastened to a perimeter 20 of an engine access opening 22. The mounting bezel includes a cover mounting surface 24 that extends past an obstruction, such as a floor mat 31, in the cab 12. The engine cover 18 has a mating surface 26 that coacts with the mounting surface 24 of the mounting bezel 16. A plurality of fastening members 28 secure the bezel 16 and the cover 18 together.

Referring to FIG. 5, in the exemplary embodiment the opening 22 is a body-in-white opening through a floor 32 and fire wall 34 of the cab 12. The bezel 16 includes an upper portion 36 that connects to the wall 34 and a lower portion 38 that connects to the floor. The bezel includes a flange portion 42 that extends around the entire perimeter of the bezel in the exemplary embodiment. Referring to FIG. 4, the flange portion 42 surrounds the engine access opening 22. In the illustrated embodiment, the bezel 16 includes a curved portions 44 that connect the upper and lower portions 38 and conforms to a transition 46 between the cab floor 32 and the wall 34.

Referring to FIGS. 5 and 6, in the illustrated embodiment the bezel is secured to the floor 32 and wall 34 with six threaded fasteners 48. In this embodiment, the floor includes four holes 50 that correspond to four holes 52 in the lower portion 38 of the mounting bezel 16. Four threaded fasteners 48 extend through the four holes 52 in the lower portion of the bezel and thread into the four holes 50 in the floor to secure the lower portion 36, 38 to the floor 32. The wall 34 includes two holes 54 that correspond to two holes 56 in the upper portion of the mounting bezel 16. Two threaded fasteners 48 extend through the two holes 56 in the upper portion of the bezel and thread into the two holes 54 in the wall 34 to secure the upper portion 36 to the wall 34.

Referring to FIGS. 4–6, a cover sealing flange portion 58 extends orthogonally from the flange portion 42. In the illustrated embodiment, the cover sealing flange portion 58 is endless and extends around the entire flange portion 42. In the exemplary embodiment, the mounting surface 24 is the outer surface of the cover mounting flange portion. The mounting surface 24 of the bezel mates with mating surface 26 of the cover 18. Referring to FIGS. 5 and 6, a gasket 60 is disposed over the cover sealing flange portion 58. In the exemplary embodiment, the gasket 60 is endless and extends around the entire cover mounting flange portion 58. The exemplary gasket 60 is made from a closed cell foam. The gasket 60 prevents engine exhaust and other gasses from entering the cab 12. The gasket 60 also prevents unabated noise from entering the cab.

Referring to FIGS. 4 and 5, the mounting bezel 16 includes four openings for connecting the cover 18 to the bezel 16. In the illustrated embodiment, two openings 62 are included in the flange portion 42 of the upper portion 36 and two openings 64 are included in the cover sealing flange portion 58 of the lower portion 38. In the exemplary embodiment, each opening 62, 64 includes a molded in insert that accepts threads of screws that are used to attach the cover to the bezel. In the exemplary embodiment, the bezel 16 is made from a mineral filled thermoset polyurethane. The mineral filled thermoset polyurethane provides a rigid support structure and withstands high temperatures from the engine.

Referring to FIGS. 4 and 5, the illustrated cover 18 is a box that is open on two adjacent substantially orthogonal sides 66a, 66b. The cover includes rounded portions 68 that correspond to the curved portion 44 of the bezel. The two open sides 66a, 66b define an endless edge 70 of the cover 18 that closely fits around the cover sealing flange portion 58 of the bezel 16. In the exemplary embodiment, the mounting surface 24 of the bezel 16 is a portion of an inner surface 72 that is adjacent to the edge 70 around the extent of the edge 70.

In the illustrated embodiment, the cover includes a mounting flange 74. The mounting flange 74 includes two mounting holes 76 that are in alignment with the two openings 62 in the top portion of the bezel 16. Two threaded fasteners 28 pass through the holes 76 and thread into the openings 62 to secure the mounting flange to the upper portion 36 of the bezel.

In the illustrated embodiment, one wall 80 of the cover 18 includes two mounting holes 82 that are in alignment with the two openings 64 in the flange 58 of the bezel 16. Two threaded fasteners 28 (See FIG. 6) pass through the holes 82 and thread into the openings 64 to secure the wall 80 to the lower portion of the bezel. In the exemplary embodiment, the mating surface 26 of the cover 18 is brought into tight engagement with the gasket 60 on the cover sealing flange 58 when the cover 18 is secured to the mounting bezel 16. In the exemplary embodiment, the cover is made from a mineral filled thermoset foamed polyurethane. The mineral filled thermoset foamed polyurethane provides good acoustical properties, is light weight, and allows for a smaller insulation blanket.

In one embodiment, the cover 18 includes an integral foldout cup holder 84. In the stowed position, the cup holder is flush with the engine cover for unobstructed access to the bunk area of the cab. The exemplary cup holder is able to support containers from a typical twelve ounce soda can to a thirty-two ounce fountain drink container.

Referring to FIG. 4, in the exemplary embodiment a floor mat 31 is mounted to the floor 32 of the cab 12. In the illustrated embodiment, the floor mat 31 covers the flange portion 42 of the lower portion of the bezel and the threaded fasteners 48 that secure the lower portion 38 of the bezel to the floor. The floor mat 31 includes a lip 86 that extends upward next to the lower portion 38 of the mounting bezel. In the illustrated embodiment, the cover sealing flange 58 and a lower edge 88 of the cover and corresponding mounting holes 82 are positioned above the lip 86 of the mat when the cover 18 is secured to the mounting bezel 16. The cover 18 can easily be removed, since the mounting holes located above the floor mat lip 86 are accessible without removing the floor mat.

The engine access cover assembly 10 is mounted over the engine access opening 22 in the cab 12 by mounting the flange portion 42 of the bezel to the perimeter of the engine access opening, connecting the floor mat to the cab floor over the flange such that the cover mounting surface of the bezel extends past the floor mat lip, applying a gasket to the cover mounting surface, bringing the mating surface of the engine access cover into contact with the gasket, and connecting the mating surface of the cover to said cover mounting surface.

The two piece design of the disclosed engine access cover assembly facilitates removal of the engine access cover in far less time than existing one piece engine access covers. The two piece design eliminates the need to remove the floor mat and other parts that need to be removed to remove the floor mat.

Although the present invention has been described with a degree of particularity, it is the intent that the invention include all modifications and alterations falling within the spirit or scope of the appended claims.

I claim:

1. In a cab of an over the highway truck or tractor an engine access cover assembly, comprising:
    a) a mounting bezel fastened to a perimeter of an engine access opening, said mounting bezel defining a cover mounting surface that extends past an obstruction in said cab;
    b) an engine cover having a mating surface coacting with said mounting surface; and
    c) a plurality of fastening members securing the bezel and cover together.

2. The engine access cover of claim 1 wherein said mounting surface is above a floor mat lip when the bezel is in use.

3. The engine access cover of claim 1 wherein said mating surface is sealed to an endless mounting surface of said mounting bezel.

4. The engine access cover of claim 1 further comprising a gasket between said cover mounting surface and said mating surface.

5. The engine access cover of claim 4 wherein said gasket is formed from a closed cell foam.

6. The engine access cover of claim 1 wherein said bezel is formed from mineral filled thermoset polyurethane.

7. The engine access cover of claim 1 wherein said cover is formed from a mineral filled thermoset foamed polyurethane.

8. The engine access cover of claim 1 further including a flush mount fold out cup holder in said cover.

9. In a cab of an over the highway truck or tractor an engine access cover assembly, comprising:
    a) a mounting bezel fastened to a perimeter of an engine access opening, said mounting bezel defining a cover mounting surface that extends past a floor mat lip in said cab;

b) a gasket on said cover mounting surface;

c) an engine cover having a mating surface in contact with said gasket and connected to said mounting surface; and d) a plurality of fastening members securing the bezel and cover together.

10. A method of mounting an engine access cover assembly over an engine access opening in a cab of an over the highway truck or tractor, comprising:

a) mounting a bezel to a perimeter of said engine access opening such that a cover mounting surface that extends past an obstruction in said cab; and b) connecting a mating surface of an engine cover to said mounting surface.

11. The method of claim 10 wherein said cover mounting surface is above a floor mat lip when said bezel is in use.

12. The method of claim 10 further comprising sealing said cover mounting surface and said mating surface together around an entire perimeter of said mounting bezel.

13. A method of mounting an engine access cover assembly over an engine access opening in a cab of an over the highway truck or tractor, comprising:

a) mounting a flange of a bezel to a perimeter of said engine access opening;

b) connecting a floor mat to a cab floor over said flange such that a cover mounting surface of said bezel extends past a floor mat lip;

c) applying a gasket to said cover mounting surface;

d) bringing a mating surface of an engine access cover into contact with said gasket; and e) connecting said mating surface to said cover mounting surface.

* * * * *